(12) United States Patent
Uchiyama et al.

(10) Patent No.: US 6,230,553 B1
(45) Date of Patent: May 15, 2001

(54) ABNORMALITY DIAGNOSIS APPARATUS OF ENGINE COOLING SYSTEM

(75) Inventors: Katsuaki Uchiyama; Katsuhiko Kawamura, both of Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/196,735

(22) Filed: Nov. 20, 1998

(30) Foreign Application Priority Data

Nov. 20, 1997 (JP) .................................................... 9-319788
Nov. 28, 1997 (JP) .................................................... 9-328395

(51) Int. Cl.$^7$ ............................. G01M 19/00; G01L 3/26
(52) U.S. Cl. ............................. 73/118.1; 73/116; 73/117.2
(58) Field of Search ................................. 73/865.9, 117.2, 73/117.3, 118.1, 116, 49.7; 123/41.31, 41.1; 165/11.1

(56) References Cited

U.S. PATENT DOCUMENTS

| 4,062,231 | * | 12/1977 | Mercik, Jr. et al. | 73/116 |
| 5,488,938 | * | 2/1996 | Ohuchi | 73/117.3 |
| 5,517,848 | * | 5/1996 | Hosoya et al. | 73/118.1 |
| 5,656,771 | * | 8/1997 | Mercik, Jr. et al. | 73/118.1 |
| 5,675,080 | * | 10/1997 | Wada | 73/117.3 |

FOREIGN PATENT DOCUMENTS

| 55-135983 | 9/1980 | (JP) . |
| 58-8225 | 1/1983 | (JP) . |
| 4-187854 | 7/1992 | (JP) . |
| 7-34943 | 2/1995 | (JP) . |

* cited by examiner

*Primary Examiner*—Benjamin R. Fuller
*Assistant Examiner*—Octavia Davis
(74) *Attorney, Agent, or Firm*—Foley & Lardner

(57) ABSTRACT

An abnormality diagnosis apparatus of an engine cooling system includes a cooling water temperature sensor 14 for detecting a cooling liquid temperature. A control unit 12 calculates a rise value of the cooling liquid temperature in a measuring section, and judges a liquid temperature convergence time at which the rise value of the cooling liquid temperature in the measuring section becomes smaller than a predetermined value, and if the cooling liquid temperature, when the liquid temperature is converged, is lower than a criteria value, the apparatus diagnoses that an abnormality is generated in the cooling system.

13 Claims, 13 Drawing Sheets

ABNORMALITY DIAGNOSIS APPARATUS OF ENGINE COOLING SYSTEM

BACKGROUND OF THE INVENTION

1. Field of the Invention

The present invention relates to an apparatus for diagnosing an abnormality of an engine cooling system.

2. Description of Related Art

Among abnormalities generated in an engine cooling system, there are, for example, defects in a cooling water sensor or in a thermostat valve. If there is generated an open stuck trouble in which a leakage is generated in the thermostat valve and the valve is kept open and can not be closed, the cooling water circulates through the radiator during warming up of the engine and the warm up is delayed.

There is a conventional apparatus for diagnosing an abnormality of the engine cooling system of this type in which a cooling liquid temperature TW, which is reached after a set warming up driving time is elapsed is compared with a reference value, and if the cooling liquid temperature TW does not reach the criteria value, it is diagnosed that there is an abnormality in the engine cooling system as disclosed in Japanese Patent Applications Laid-open Nos. 4-187854 and 7-34943, for example.

However, in such a conventional abnormality diagnosis apparatus of the engine cooling system, even if there is an abnormality such as leakage in the thermostat valve, if the engine is driven at high load during warming up, since the cooling liquid temperature TW abruptly rises, this abnormality can not be judged. Further, even if the thermostat valve is normally operated, if the engine is driven at an idle speed during warming up, since the rise of the cooling liquid temperature TW is delayed, there is a possibility that it is misjudged that the thermostat is abnormal.

In an abnormality diagnosis apparatus of an engine cooling system disclosed n Japanese Utility Model Application Laid-open No. 55-135983, a plurality of cooling water sensors are provided for detecting leakage of the thermostat valve.

In an abnormality diagnosis apparatus of an engine cooling system disclosed in Japanese Patent Application Laid-open No. 58-8225, a movable contact is provided in the thermostat valve to detect open stuck or close stuck.

However, in such a conventional apparatus of an engine cooling system, it is necessary to provide a sensor or the like, increases the cost to manufacture the apparatus.

SUMMARY OF THE INVENTION

The present invention has been accomplished in view of the above problem, and it is an object of the present invention to enhance the precision of diagnosis in an abnormality diagnosis apparatus of an engine cooling system.

To achieve the object described above, there is provided an abnormality diagnosis apparatus of an engine cooling system comprises; a cooling liquid temperature sensor for detecting a cooling liquid temperature; a first section for calculating a rise value of the cooling liquid temperature in a measuring section; a second section for judging a liquid temperature convergence time at which the rise value of the cooling liquid temperature in the measuring section becomes smaller than a predetermined value; and a third section for diagnosing that there is an abnormality in the cooling system when the cooling liquid temperature in the liquid temperature convergence time is smaller than a criteria value.

In this abnormality diagnosis apparatus of the engine cooling system, the rise value of the cooling liquid temperature in the measuring section is calculated, a liquid temperature convergence time at which said rise value of said cooling liquid temperature in said measuring section becomes smaller than the predetermined value is judged; it is judged that there is an abnormality in the cooling system when said cooling liquid temperature in said liquid temperature convergence time is smaller than the criteria value.

For example, when the engine is driven at an idle during warming up of the engine, a timing of the abnormality diagnosis of the cooling system is delayed in correspondence with the fact that the cooling liquid temperature slowly rises and convergence of the cooling liquid temperature is delayed. Therefore, it is possible to precisely diagnose whether the thermostat valve and the like are normally operated.

Further, since the abnormality diagnosis of the cooling system is conducted based on the detection value of the cooling water temperature sensor, it is unnecessary to newly add the sensor or the like, and the structure can be simplified.

In a preferred embodiment, the abnormality diagnosis apparatus of an engine cooling system comprises: a unit for detecting a load of the engine; a fourth section for integrating the load of the engine detected in the measuring section to calculate a heat value of the engine; and a fifth section for judging whether the cooling liquid temperature is converging by the calculated heat value of the engine.

In this abnormality diagnosis apparatus of an engine cooling system, the load of the engine detected in the measuring section is integrated to calculate the heat value of the engine, and it is judged whether the cooling liquid temperature is converging by the calculated heat value of the engine.

For example, when the engine is driven at high load during warming up of the engine, and the measuring section is shortened with increase of the heat value of the engine, and the engine is driven at an idle speed during warming up so that the temperature rise of the cooling liquid temperature is delayed, since the measuring section is increased, it is possible to accurately judge whether the thermostat valve and the like are normally operated without being influenced by increase or decrease the heat value of the engine.

By using the existing air flow meter or signal of fuel injection amount as the unit for detecting a load of the engine, it is unnecessary to newly add the sensor or the like, and the structure can be simplified.

The reference value for judging the completion time of the measuring section based on the heat value of the engine is corrected in accordance with the vehicle speed or the intake air temperature.

In this case, by correcting the reference value for judging the completion time of the measuring section in accordance with a vehicle speed or an intake air temperature, it is possible to calculate the measuring section suitable for the heat value of the engine in accordance with the radiation of heat of the radiator or the engine, and the precision of the diagnosis can be enhanced.

Further, the criteria value may be corrected in accordance with a vehicle speed or an intake air temperature.

In this case, by correcting the criteria value which diagnoses the abnormality in the cooling system based on the cooling liquid temperature at the time of the convergence of the liquid temperature, in accordance with a vehicle speed or an intake air temperature, the precision of the diagnosis can be enhanced without being influenced by an increase or a decrease in the heat value of the engine.

Further, the heat value of the engine may be corrected in accordance with at least one of a vehicle speed, an ignition timing, a mixing ratio and the engine revolution number.

In this case, by correcting the heat value of the engine in accordance with at least one of a vehicle speed, an ignition timing, a mixing ratio and the engine revolution number, the heat value of the engine can be calculated at high accuracy, and the precision of the diagnosis can be enhanced.

In another preferred embodiment, the abnormality diagnosis apparatus of an engine cooling system comprising: a unit for detecting a load of an engine; a fourth section for integrating a detected load of the engine to calculate a heat value of the engine; and a sixth section for diagnosing whether an abnormality is generated in the cooling system in accordance with a detected cooling liquid temperature Tw and the heat Value of the engine.

In this abnormality diagnosis apparatus of an engine cooling system, the load of the engine is integrated to calculate the heat value of the engine, and it is judged whether the abnormality is generated in the cooling system in accordance with a detected cooling liquid temperature Tw and the heat value of the engine.

For example, when the engine is driven at high load during warming up, since the heat value of the engine is high, the cooling liquid temperature Tw is abruptly increased, but by correcting the criteria value or the judgement period of time in accordance with the heat value of the engine, it is possible to accurately diagnose whether the thermostat valve and the like are normally operated based on the cooling liquid temperature Tw.

Further, by using the existing air flow meter or signal of fuel injection amount as the unit for detecting a load of the engine, it is unnecessary to newly add the sensor or the like, and the structure can be simplified.

In further preferred embodiment, the abnormality diagnosis apparatus of an engine cooling system comprises: a seventh section for calculating a rise value of a cooling liquid temperature Tw in a judgement period of time based on a detected cooling liquid temperature Tw; a unit for detecting a load of an engine; a fourth section for integrating a detected load of the engine to calculate a heat value of the engine; an eighth section for calculating a liquid temperature rise judgement reference value in the judgement period of time in accordance with the calculated heat value; and a ninth section for diagnosing that an abnormality is generated in the cooling system when the rise value of the detected cooling liquid temperature Tw is lower than the liquid temperature rise judgement reference value.

In this abnormality diagnosis apparatus of an engine cooling system, the rise value of a cooling liquid temperature Tw in a judgement period of time is calculated based on a detected cooling liquid temperature Tw, the liquid temperature rise judgement reference value in the judgement period of time is calculated in accordance with the heat value calculated by integrating the load of the engine, and the apparatus diagnoses that the abnormality is generated in the cooling system when the rise value of the detected cooling liquid temperature Tw is lower than the liquid temperature rise judgement reference value.

For example, when the engine is driven at high load during warming up of the engine, and the cooling liquid temperature Tw is abruptly increased with increase of the heat value of the engine, the liquid temperature rise criteria value calculated in accordance with the heat value of the engine is increased. On the other hand, when the engine is driven at an idle during warming up of the engine and the rise of the cooling liquid temperature Tw is delayed, the liquid temperature rise criteria value is lowered. Therefore, it is possible to accurately judge whether the thermostat valve and the like are normally operated without being influenced by an increase or a decrease in the heat value of the engine.

Further, it is unnecessary to wait for the diagnosis until warming up of the engine is sufficiently carried out unlike the conventional apparatus, and it is possible to complete the diagnosis before the cooling liquid temperature Tw reaches the criteria value (for example, 70° C.) which is set in the conventional apparatus.

The liquid temperature rise judgement reference value may be corrected in accordance with a vehicle speed or an intake air temperature.

By correcting the liquid temperature rise judgement reference value in accordance with a vehicle speed or an intake air temperature, the liquid temperature rise judgement reference value can be calculated in accordance with the radiation of heat of the radiator or the engine, and the precision of the diagnosis can be enhanced.

In a further preferred embodiment, the abnormality diagnosis apparatus of an engine cooling system comprises: a unit for detecting a load of an engine; a fourth section for integrating a detected load of the engine to calculate a heat value of the engine; a tenth section for estimating the cooling liquid temperature in accordance with the calculated heat value of the engine; and section for diagnosing that an abnormality is generated in the cooling system when the cooling liquid temperature Tw detected when the estimated cooling liquid temperature reaches a judgement permission liquid temperature is lower than the judgment value.

In this abnormality diagnosis apparatus of an engine cooling system, the cooling liquid temperature is estimated in accordance with the heat value of the engine calculated by integrating the detected load of the engine, and it is judged that the abnormality is generated in the cooling system when the cooling liquid temperature Tw detected when the estimated cooling liquid temperature reaches the judgement permission liquid temperature is lower than the judgment value.

For example, in this abnormality diagnosis apparatus of an engine cooling system, when the engine is driven at high load during warming up of the engine, and the cooling liquid temperature Tw is abruptly increased with increase of the heat value of the engine, the criteria value calculated in accordance with the heat value of the engine is shortened. On the other hand, when the engine is driven at an idle during warming up of the engine and the rise of the cooling liquid temperature Tw is delayed, the criteria value is elongated. Therefore, it is possible to accurately judge whether the thermostat valve and the like are normally operated.

The judgement permission liquid temperature may be corrected in accordance with a vehicle speed or an intake air temperature.

In this case, by correcting the judgement permission liquid temperature in accordance with a vehicle speed or an intake air temperature, the judgement permission liquid temperature can be calculated in accordance with a radiation amount of the radiator or the engine, and the precision of the diagnosis can be enhanced.

The heat value of the engine may be corrected in accordance with at least one of a vehicle speed, an ignition timing, a mixing ratio and the engine revolution number.

In this case, by correcting the heat value of the engine in accordance with at least one of the vehicle speed, the ignition timing, the mixing ratio and the engine revolution number, it is possible to calculate the heat value of the engine at high accuracy, and to enhance the precision of the diagnosis.

DETAILED DESCRIPTION OF THE PREFERRED EMBODIMENTS

A first embodiment of the present invention will be explained below with reference to the accompanying drawings.

Figure 1:
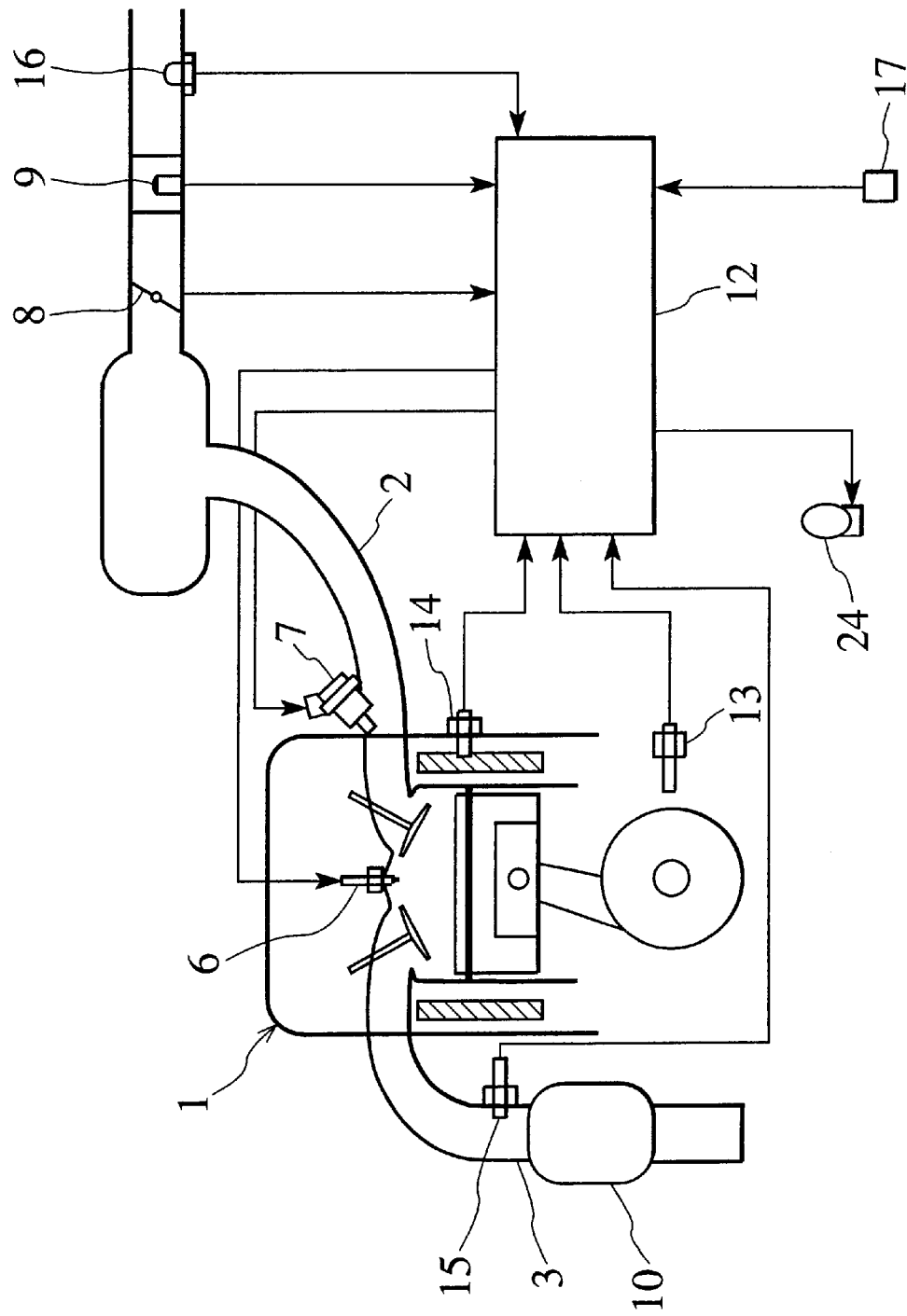
FIG. 1 is a system diagram showing a control system of an engine to which an abnormality diagnosis apparatus of an engine according to embodiments of the present invention is applied.

As shown in FIG. 1, and engine 1 inhales an intake air (mixture) from intake passage 2 as an induction valve is opened, the intake air is compressed by a piston, and is ignited and burnt, and as an exhaust valve is opened, exhaust is discharged to an exhaust passage 3, and such processes are continuously repeated.

The intake passage 2 is provided at its intermediate portion with an injector 7 for injecting a fuel to an intake port and a throttle valve 8 which is associatively connected to an accelerator pedal for throttling the intake, and is provided at an upstream portion of the intake passage 2 with an air flow meter 9 for detecting the intake amount.

The exhaust passage 3 is provided at its intermediate portion with a catalytic converter rhodium (CCRO) 10 for oxidizing unburned HC and CO in the exhaust, and for reducing NOx.

Input to a control unit 12 are an intake amount QA detected by the air flow meter 9, an idle switch signal SW, the engine revolution number Ne detected by an engine revolution number sensor 13, an intake temperature Ta detected by an intake temperature sensor 16, a vehicle speed V detected by a vehicle speed sensor 17, a cooling liquid temperature TW detected by a cooling water temperature sensor 14 and the like. In accordance with such driving states, a fuel injection amount Ti, an ignition timing ADV and the like are calculated.

After warming up of the engine in which the cooling liquid temperature TW detected by the cooling water temperature sensor 14 increases and exceeds a predetermined value TW1, the control unit 12 inputs an output corresponding to oxygen concentration in the exhaust detected by an $O_2$ sensor 15, and feedback controls the fuel injection amount from the injector 7 such that the mixture assumes a theoretical air-fuel ratio for maintaining the conversion efficiency by the catalytic converter rhodium 10 at the maximum value.

Figure 2:
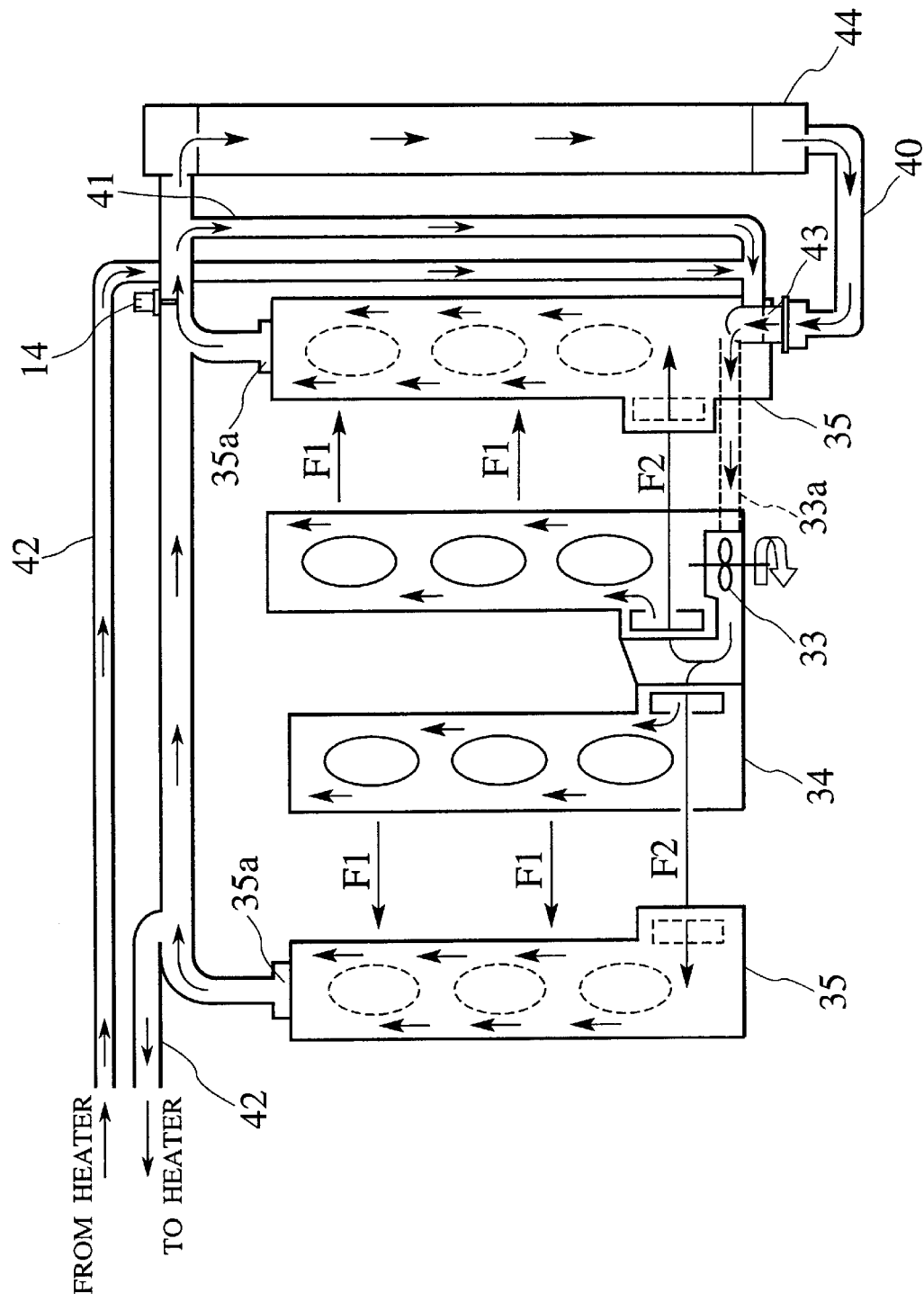
FIG. 2 is a diagram for showing a structure of a cooling apparatus of the engine shown in FIG. 1.

As shown in FIG. 2, the cooling apparatus mounted in a V-type six-cylinder engine includes a water jacket 34 formed in a cylinder block, and another water jacket 35 formed in a cylinder head. The block-side water jacket 34 circulates cooling water (hereinafter alternatively referred to as cooling liquid) around each cylinder accommodating a piston, and the head-side water jacket 35 circulates cooling water around a combustion chamber wall. The cooling water flows as shown by arrows in the drawings.

A water pump 33 for pumping the cooling water to each of the water jackets 34 and 35 is provided. The rotation of a crankshaft is transmitted through a belt and a pulley (both not shown) to the water pump 33. The cooling water discharged from the water pump 33 circulates the block-side water jacket 34 as shown by arrows in the drawings and then, diverges into a flow F1 flowing into the head-side water jacket 35 and a flow F2 flowing from an end of the block-side water jacket 34 directly into the head-side water jacket 35.

A cooling passage 40 is disposed for introducing the cooling water flowing out from an exit 35a of the head-side water jacket 35 into an intake port 33a of the water pump 33 through a radiator 44. The radiator 44 functions as a heat exchanger for facilitating the radiation of heat from the cooling water circulating in the radiator 44 to the open air. A bypass passage 41 is disposed for introducing the cooling water flowing out from the exit 35a of the head-side water jacket 35 into the intake port 33a of the water pump 33 bypassing the radiator 44. A resistance of water passing through the bypass passage 41 is set greater than a resistance of water passing through the cooling passage 40 at a predetermined ratio. A heater passage 42 is disposed for introducing the cooling water flowing out from the exit 35a of the head-side water jacket 35 into the intake port 33a bypassing the radiator 44. The heater passage 42 is provided at its intermediate portion with a heater core for heating a passenger room which is not shown.

A thermostat valve 43 for opening and closing the cooling passage 40 in accordance with the cooling water temperature is interposed between the radiator 44 and the water pump 33 at upstream of the juncture of the bypass passage 41. A temperature sensing portion of the thermostat valve 43 is disposed at downstream of the juncture of the bypass passage 41 and the heater passage 42.

When it is cold and the cooling water temperature is lower than a predetermined value, the thermostat valve 43 is closed, and all of the cooling water discharged from the water pump 33 passes the bypass passage 41 and flows bypassing the radiator 44, thereby facilitating the warm up and a discharge amount of unburned HC is decreased.

When it is warm and the cooling water temperature becomes equal to or higher than the predetermined value, the thermostat valve 43 is opened, and the cooling water discharged from the water pump 33 circulates each of the head-side and block-side water jackets 34 and 35 and then, circulates the radiator 44 for radiating the heat. With the above structure, temperature of the cooling water is maintained within a predetermined range.

Meanwhile, in a case of trouble, for example, if a leakage is generated around the thermostat valve 43 or the thermostat valve 43 is stuck at its opening state and can not be closed, since the cooling water circulates through the radiator 14 from the warming up state, there is a problem that the warming up of the engine 1 is delayed.

Figure 3:
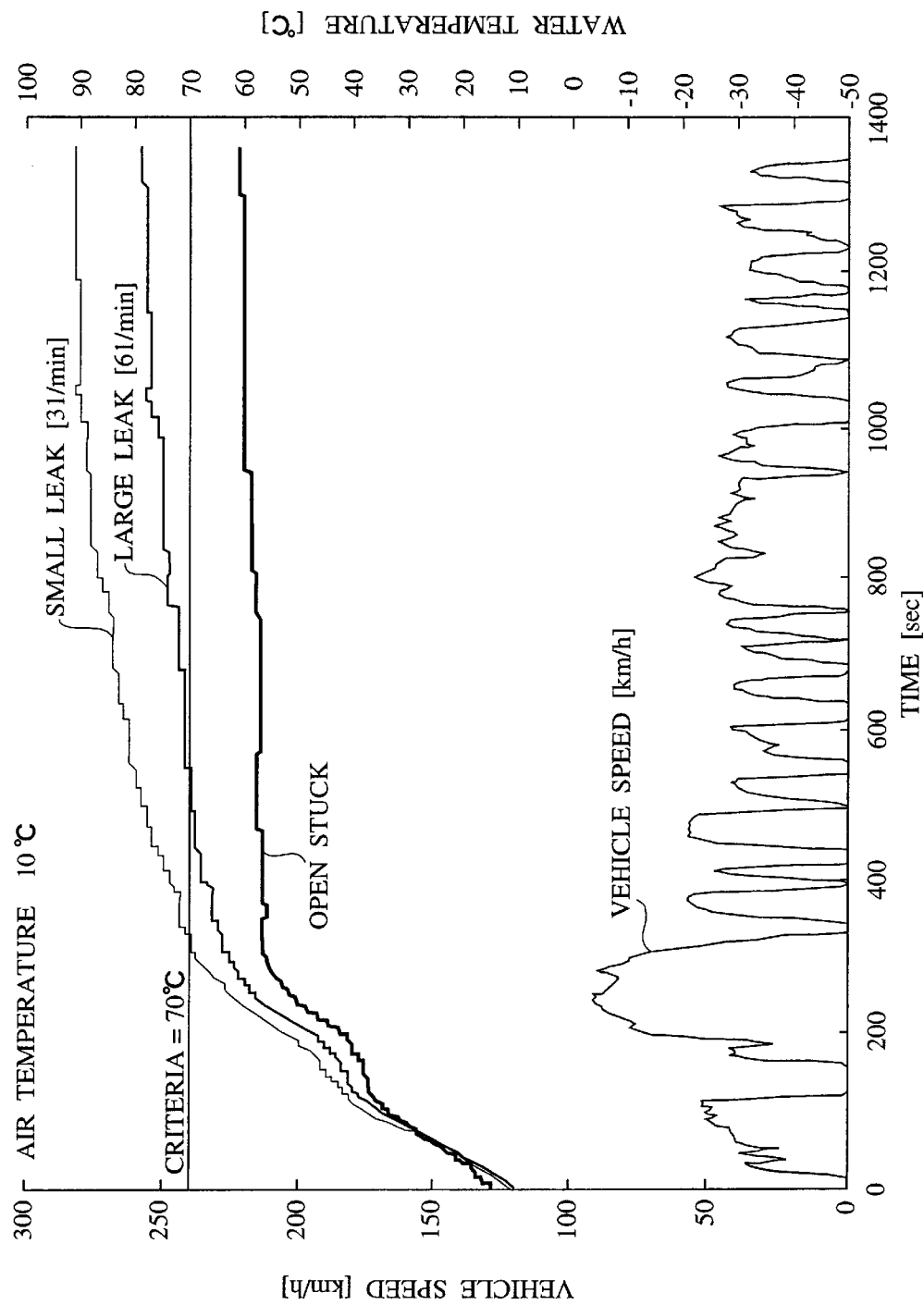
FIG. 3 is a graph showing an example in which a cooling water temperature of the engine shown in FIG. 1 is changed.

FIG. 3 shows results of measurement of variation in the cooling water temperature when a vehicle runs in a predetermined functional test procedure (FTP) in which the vehicle repeats starting and stopping after the engine starts, and indicates the results in three cases, i.e., a case in which the thermostat valve is in open stuck trouble (open stuck), a case in which a leakage amount of the thermostat valve is as large as 6 liters/minute (large leak), and a case in which the leakage amount of the thermostat valve is as small as 3 liters/minute (small leak). From FIG. 3, it can be found that as the leakage amount of the thermostat valve is larger, the temperature rise of the cooling water is delayed, and when the thermostat valve is in open stuck trouble, the cooling water temperature does not reach an appropriate value (70° C.).

Figure 4:
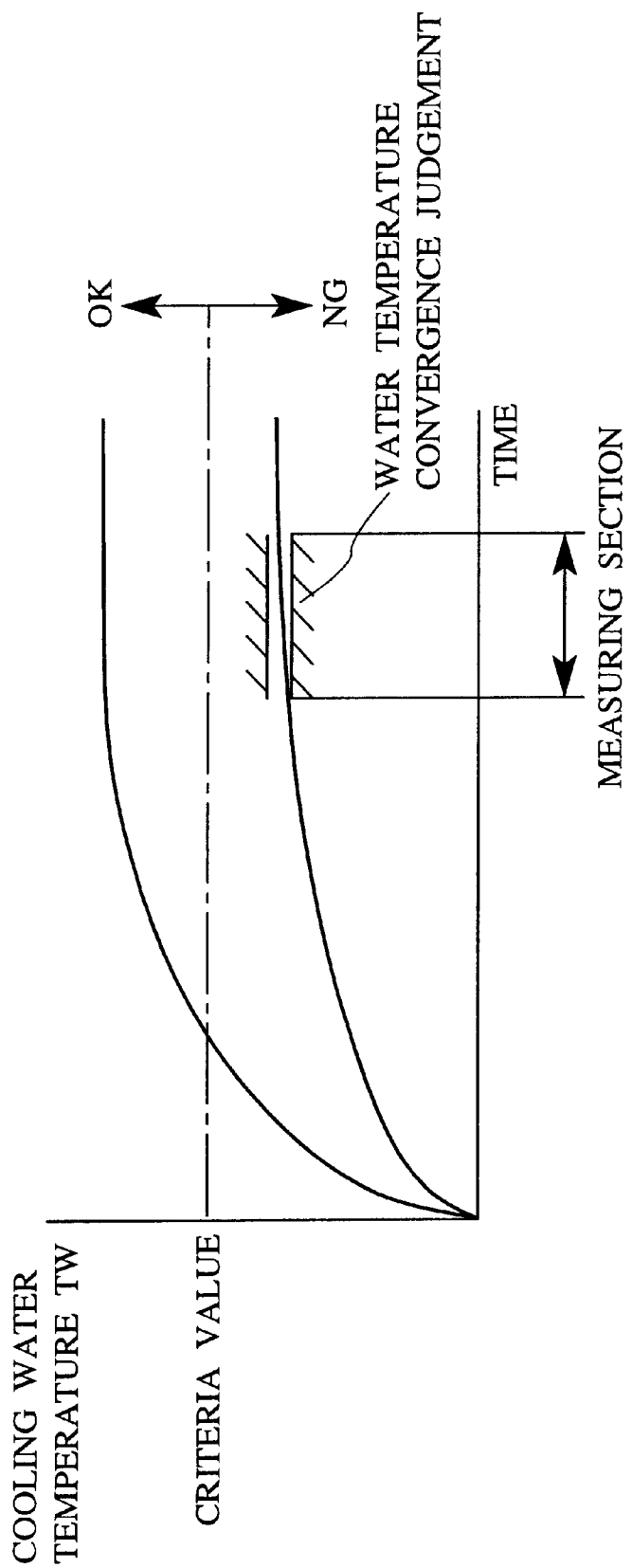
FIG. 4 is a graph showing an example in which a cooling water temperature of the engine shown in FIG. 1 is changed.

To cope with this problem, in the first embodiment of the present invention, a rise value of the cooling water temperature TW in the measuring section is calculated to judge a water temperature convergence time at which the rise value of the cooling liquid temperature TW in the measuring section becomes smaller than a predetermined value. As shown in FIG. 4, if the cooling liquid temperature TW at the time of convergence of the water temperature is increased to a value equal to or higher than the criteria value, the apparatus diagnoses the cooling system as normal, and if the cooling liquid temperature TW at the time of convergence of the water temperature smaller than the criteria value, the apparatus diagnoses the cooling system as abnormal.

For example, when the engine 1 runs at an idle during warming up of the engine 1, the cooling liquid temperature TW rises slowly and the convergence timing is delayed, and in corresponding thereto, the timing for conducting the abnormality diagnosis of the cooling system is delayed, and it is possible to appropriately judge whether the thermostat valve 43 and the like are operated normally.

In the present embodiment, the heat value of the engine 1 is calculated based on the integration value of the intake air amount QA of the engine 1 at the time of warming up of the engine 1, and a time point at which the heat value of the engine 1 becomes equal to or greater than a reference value is judged to be a completion time of the measuring section.

For example, the measuring section is shortened as the engine 1 is driven at a high load and the heat value of the engine 1 is increased during warming up of the engine 1. On the other hand, the engine 1 runs at the idle during warming up of the engine 1 and the rise of the cooling liquid temperature TW is delayed, the measuring section is elongated. Therefore, it is possible to accurately judge whether the thermostat valve 43 and the like are normally operated without being influenced by an increase or a decrease in the heat value of the engine.

The heat value of the engine 1 is corrected in accordance with the vehicle speed V, the intake air temperature Ta, the ignition timing ADV, the mixing ratio, the engine revolution number Ne and the like. Therefore, it is possible to calculate the heat value of the engine 1 at high accuracy, and the precision of the diagnosis can be enhanced.

Figure 5:
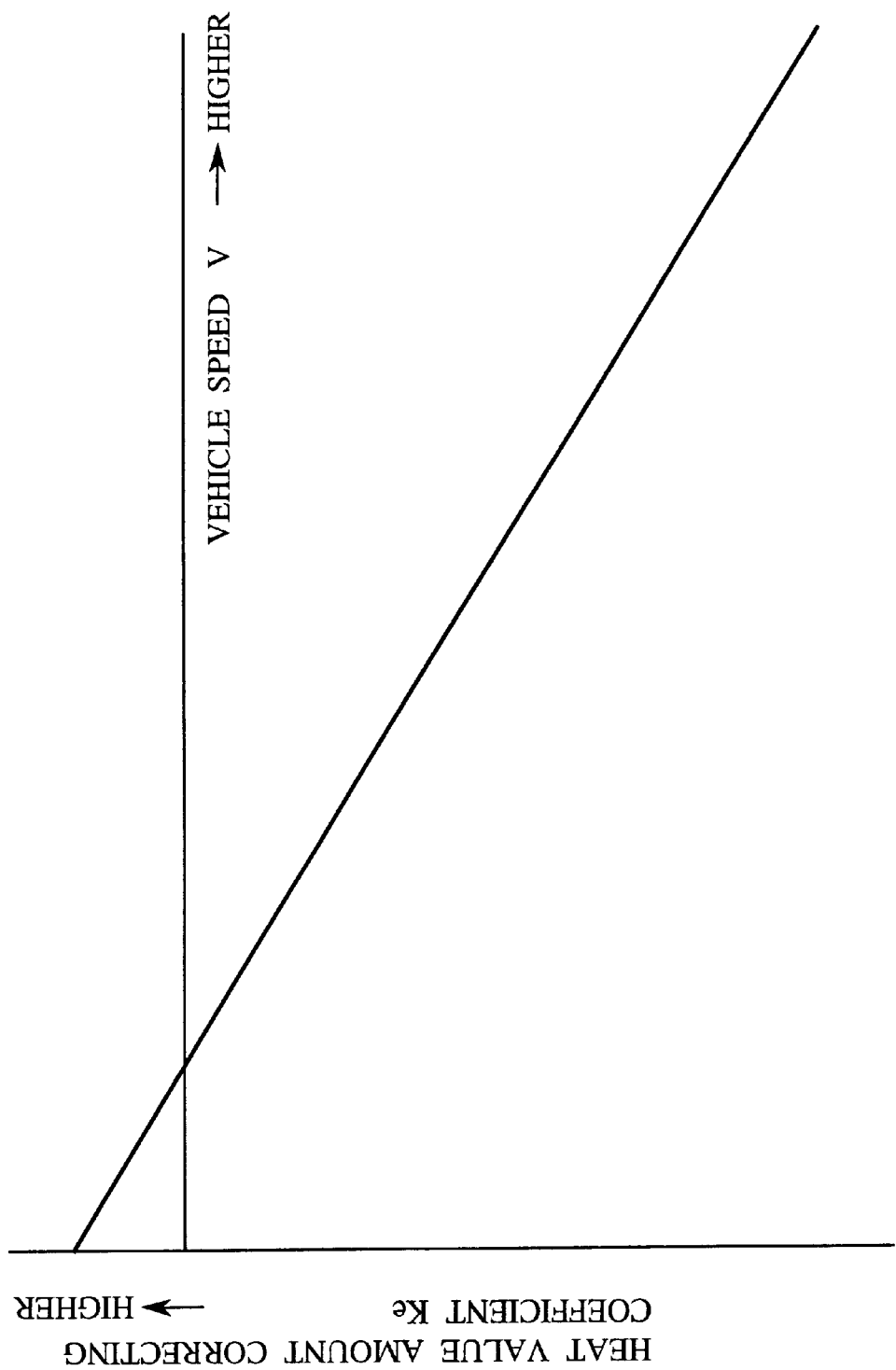
FIG. 5 is a graph of characteristic showing the relation between a heat value correcting coefficient Ke and a vehicle speed V according to the embodiments of the present invention

The heat value correcting coefficient Ke is retrieved in accordance with the vehicle speed V based on a table shown in FIG. 5. An intake air mount integration value SUQIVL is corrected by the heat value correcting coefficient Ke such that the heat value correcting coefficient Ke is decreased as the vehicle speed V is increased in corresponding to increase in the heat value of the engine 1 as the vehicle speed V is increased.

The reference value for judging the completion time of the measuring section based on the heat value of the engine 1 is corrected in accordance with the vehicle speed V, the intake air temperature Ta and the like. With this feature, the measuring section is calculated in accordance with the heat radiation amount of the engine 1 and the radiator 44, and the precision of the diagnosis can be enhanced.

The criteria value for diagnosing the abnormality of the cooling system based on the cooling water temperature TW at the time of the convergence of the water temperature is corrected in accordance with the vehicle speed V, the intake air temperature Ta and the like. With this feature, the precision of the diagnosis can be enhanced without being influenced by the heat radiation amount of the engine 1 and the radiator 44.

Figure 6:
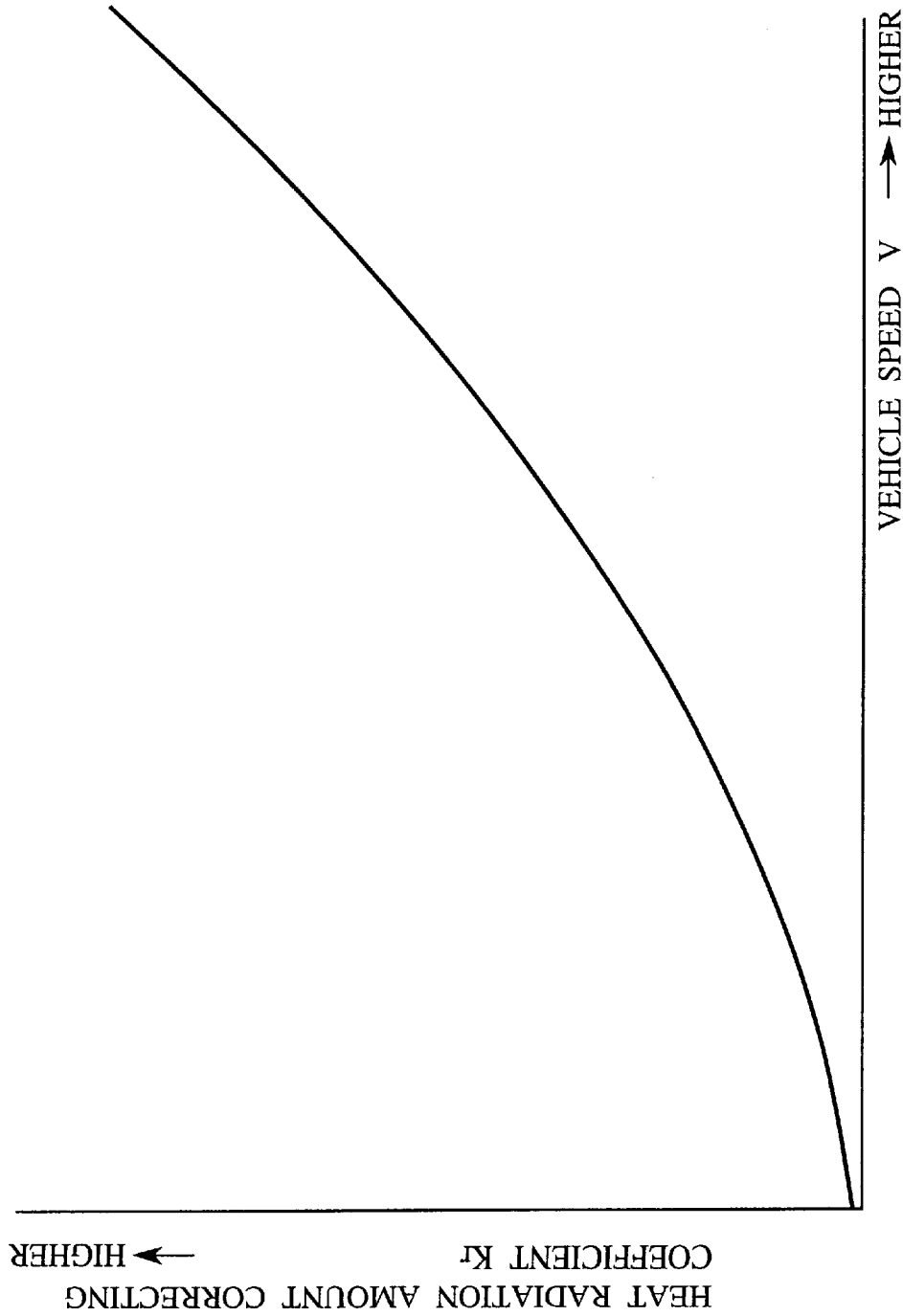
FIG. 6 is a graph of characteristic showing the relation between the heat value correcting coefficient Ke and the vehicle speed V according to the embodiments of the present invention

The heat radiation correcting coefficient Kr is retrieved in accordance with the vehicle speed V based on a table shown in FIG. 6. A water temperature rise judging reference value is corrected by the heat radiation correcting coefficient Kr such that the heat radiation correcting coefficient Kr is increased as the vehicle speed V is increased in corresponding to increase in the heat value of the radiator 44 as the vehicle speed V is increased.

Figure 7:
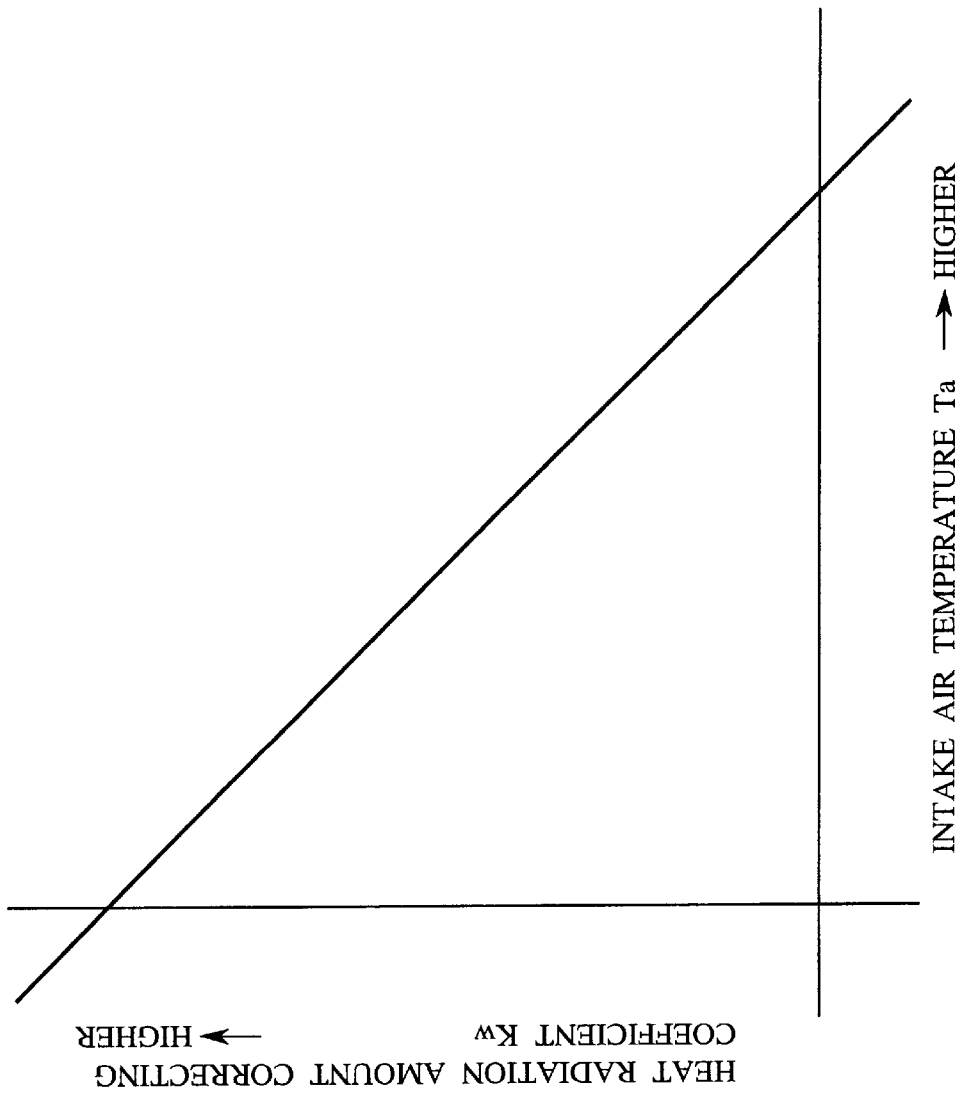
FIG. 7 is a graph of characteristic showing the relation between the heat value correcting coefficient Ke and an intake air temperature Ta.

The heat radiation correcting coefficient Kw is retrieved in accordance with the intake air temperature Ta based on a table shown in FIG. 7. The water temperature rise judging reference value is corrected by the heat radiation correcting coefficient Kw such that the heat radiation correcting coefficient Kw is decreased as the intake air temperature Ta is increased in corresponding to decrease in the heat value of the engine 1 as the intake air temperature Ta is increased.

Figure 8:
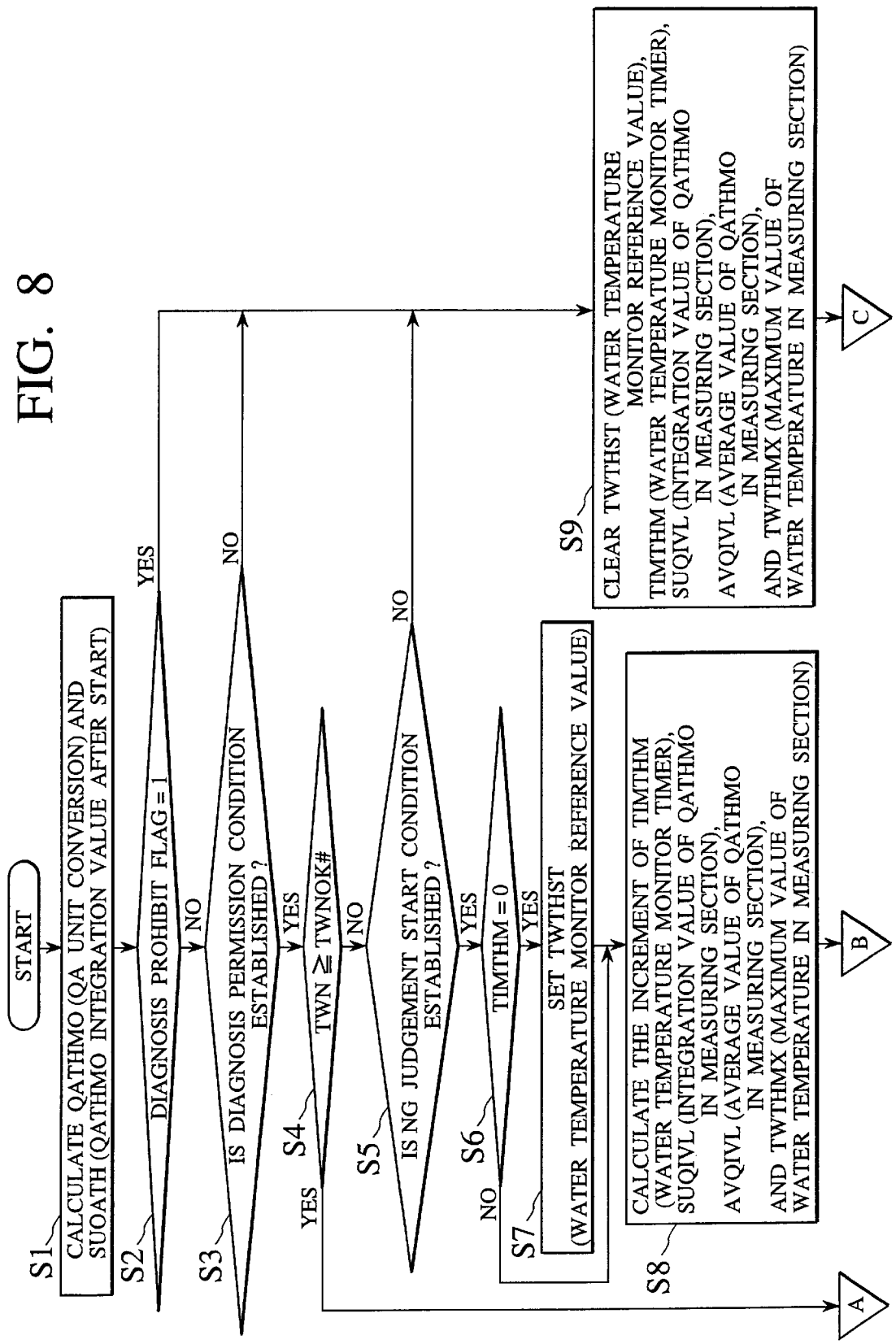
FIG. 8 is the first half of a flowchart showing a control content for diagnosing an abnormality of the cooling apparatus of the first embodiment of the invention.
Figure 9:
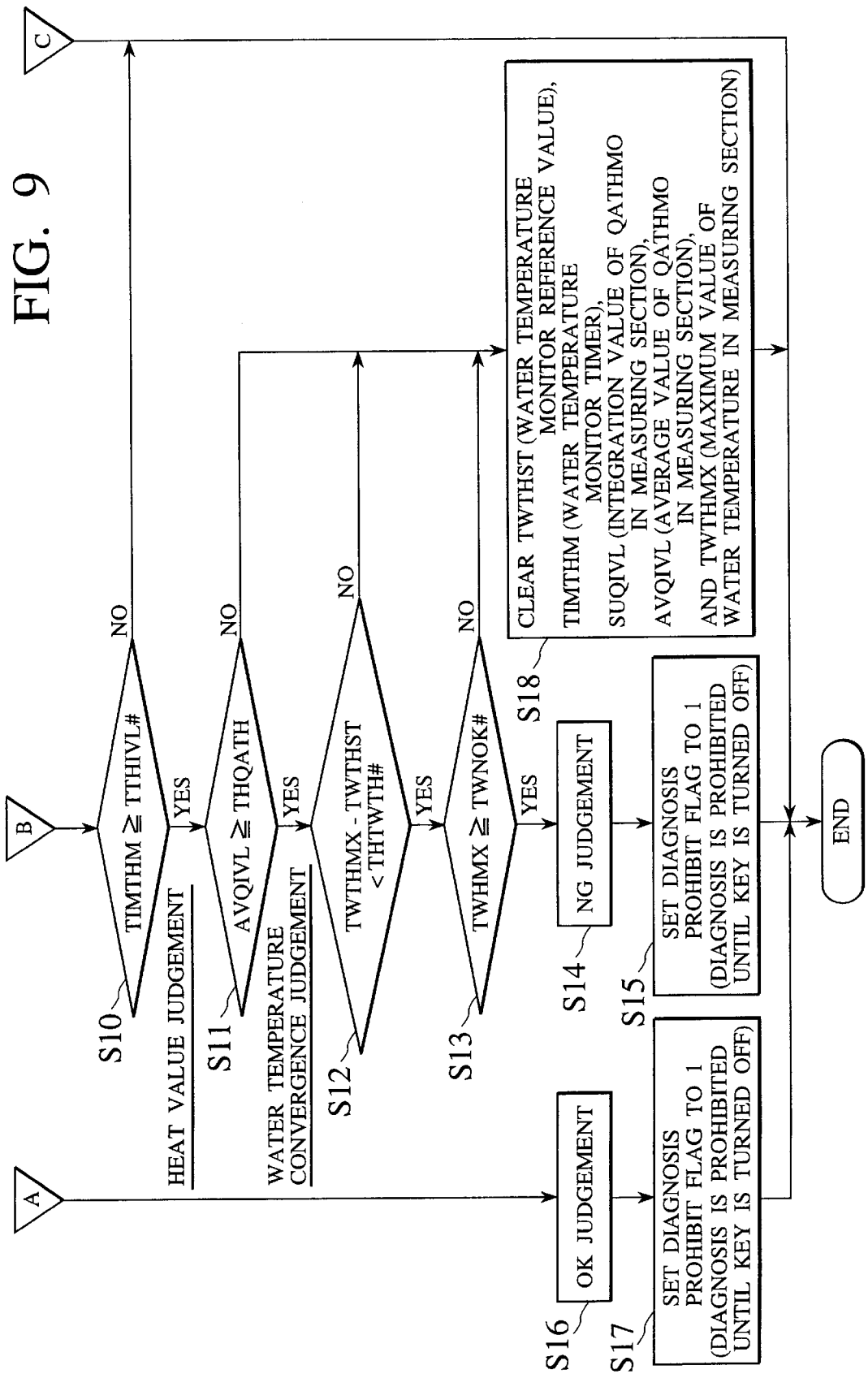
FIG. 9 is the latter half of the flowchart showing the control content for diagnosing the abnormality of the cooling apparatus of the first embodiment of the invention.

Flowcharts in FIGS. 8 and 9 indicate a control program for diagnosing the abnormality of the cooling apparatus conducted by the control unit 12, and this program is conducted at predetermined cycles during driving of the engine 1.

First, step S1, a conversion value QATHMO of the intake air amount QA detected by the air flow meter 9 and an intake air amount integration value SUQATH obtained by integrating the intake air amount conversion amount QATHMO after start of the engine are calculated.

Subsequently, the process is advanced to step S2, it is confirmed that a diagnosis prohibit flag is not set and then, the processing is advanced to step S3 where it is judged whether a diagnosis condition is established. For judging the diagnosis condition, it is confirmed that the engine 1 is rotating, and that there is no abnormality in the cooling liquid temperature sensor 14, the air flow meter 9, the engine revolution number sensor 13, the intake temperature sensor 16 and the vehicle speed sensor 17.

If the diagnosis condition is established, the processing is advanced to step S4 where it is confirmed that the cooling liquid temperature TWN after start of the engine is lower than a criteria value TWNOK# (e.g., 70° C.). Then, the processing is advanced to step S5 where it is judged whether a diagnosis starting condition is established. For judging the diagnosis starting condition, it is judged whether an intake air amount integration value SUQATH after start of the engine is equal to or higher than a predetermined value TOQATH, and whether the Edriving time after start of the engine is equal to or longer than a predetermined value TMTHMO#.

When the diagnosis starting condition is established, the processing is advanced to step S6 where it is confirmed that a water temperature monitor timer TIMTHM is cleared, and a water temperature monitor reference value TWTHST is set in step S7. Then, the processing is advanced to step S8 where the water temperature monitor timer TIMTHM is incremented, an intake air amount integration value SUQIVL in which the intake air amount conversion value QATHMO in the measuring section is integrated is calculated, the average value AVQIVL of the intake air amount conversion value QATHMO in the measuring section is calculated, and the maximum value TWTHX of the cooling liquid temperature TW in the measuring section is calculated. Here, the average value AVQIVL of the intake air amount conversion value QATHMO is a value obtained by dividing the intake air amount integration value SUQIVL by time of the measuring section and corrected by the heat value amount correcting coefficient Ke. The process conducted in step S8 corresponds to the fourth section calculating the heat value of the engine and to the section for correcting the heat value of the engine in the claims. Further, the air flow meter 9 corresponds to the unit for detecting the engine load in the claims. A signal of the fuel injection amount Ti may be used as a parameter for detecting the load of the engine 1.

Next, the processing is advanced to step S10 where it is confirmed that the water temperature monitor timer TIMTHM becomes equal to or greater than a predetermined value TTHIVL# and then, the processing is advanced to step S11 where it is judged whether the average value AVQIVL of the intake air amount QATHMO in the measuring section is equal to or greater than the reference value THQATH. The reference value THQATH is corrected by the heat radiation amount correcting coefficient Kr, the heat radiation amount correcting coefficient Kw and the like. The process conducted in step S11 corresponds to section for judging that the time point at which the calculated heat value of the engine becomes equal to or greater than the reference value is the completion time of the measuring section in the claims.

If it is judged that the heat value of the engine 1 is equal to or greater than the reference value, the processing is advanced to step S12 where it is judged whether a difference (rise value) between the maximum value TWTHX of the cooling liquid temperature TW in the measuring section and the cooling liquid temperature TWTHST when the measuring is started is smaller than a criteria value THTWTH#. The criteria value THTWTH# is corrected by the heat radiation amount correcting coefficient Kr, the heat radiation amount correcting coefficient Kw and the like. The process conducted in step S12 corresponds to the second section for judging the liquid temperature convergence time in the claims.

When it is judged that the rise of the cooling liquid temperature TW is converged, the processing is advanced to step S13 where it is judged whether the maximum value TWTHX of the cooling liquid temperature TW in the measuring section is lower than the reference value TWNOK#. If it is judged that the maximum value TWTHX of the cooling liquid temperature TW in the measuring section is lower than the reference value TWNOK#, the processing is advanced to step S14 where the apparatus diagnosis the cooling system as abnormal, and the warning lamp 24 is turned ON to inform the driver of this abnormality. Then, the processing is advanced to step S15 where the diagnosis prohibit flag is set to prohibit the diagnosis of this routine until the ignition switch is turned OFF. The process in step S14 corresponds to the section for diagnosing the cooling system as abnormal when the cooling liquid temperature is lower than the criteria value at the time of convergence of the liquid temperature in the claims.

If the diagnosis flag is not set in step S2, if the diagnosis condition is not established in step S3, and if the diagnosis starting condition is not established in step S5, the processing is advanced to step S9 where each the data is cleared.

If it is judged that the rise of the cooling liquid temperature TW is not converged in the measuring section, or if it is judged that the maximum value TWTHX of the cooling liquid temperature TW is equal to or higher than the reference value TWTHST, the processing is advanced to step S18 where each the data is cleared.

If it is judged in step S4 that the cooling liquid temperature TWN when the engine is started, the processing is advanced to step S16 where the apparatus diagnoses the cooling system as normal. Then, the processing is advanced to step S17 where the diagnosis prohibit flag is set to prohibit the diagnosis of this routine until the ignition switch is turned OFF.

Next, a second embodiment of the present invention will be explained.

In the second embodiment of the invention, the load of the engine 1 is integrated to calculate the heat value of the engine 1, and it is judged whether the abnormality is generated in the cooling system in accordance with the heat value of the engine 1 and the cooling liquid temperature Tw detected by the cooling liquid temperature sensor 14.

Figure 10:
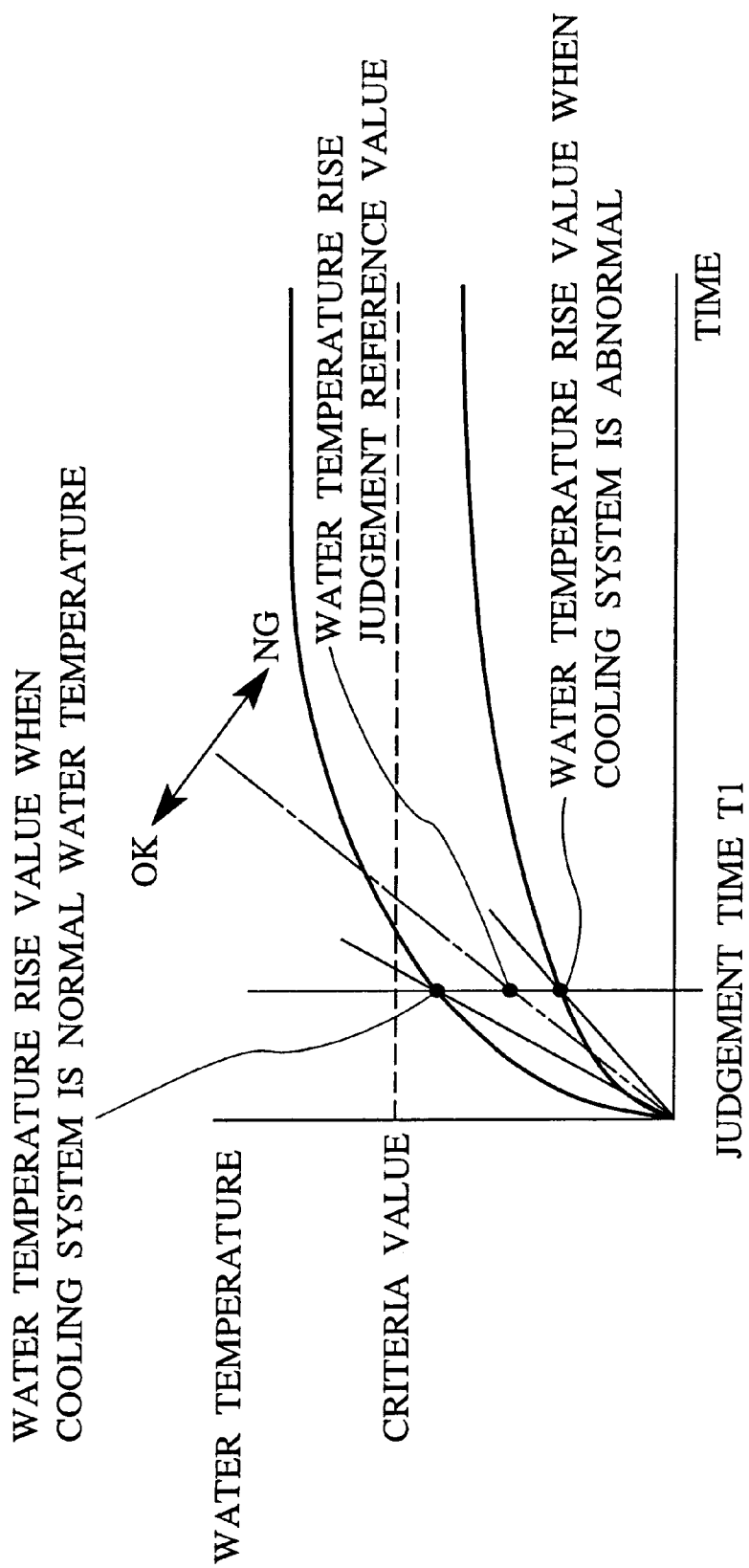
FIG. 10 is a graph showing an example in which a cooling water temperature of the engine of a second embodiment of the invention.

In the present embodiment, the control unit 12 calculates the heat value of the engine 1 based on the integration value of the intake air amount Qa of the engine at the time of warming up, calculates the water temperature rise judgement reference value after a judgement time T1 has been elapsed based on the heat value of the engine 1, and calculates the water temperature rise value after the judgement time T1 has been elapsed based on the cooling liquid temperature Tw detected by the cooling water temperature sensor 14. As shown in FIG. 10, if the water temperature rise value is equal to or higher than the water temperature rise judgement reference value, the apparatus diagnoses the cooling system as normal, and if the water temperature rise value is lower than the water temperature rise judgement reference value, the apparatus diagnoses the cooling system as abnormal.

For example, when the engine 1 is driven at high load during warming up of the engine 1, the cooling liquid temperature Tw abruptly rises as the heat value of the engine 1 is increased, but the calculated water temperature rise judgement reference value is increased as the heat value of the engine 1 is increased. Therefore, it is possible to accurately judge whether there is abnormality in the thermostat valve 43 or the cooling liquid temperature sensor 14. On the other hand, when the engine 1 runs at an idle during the warming up, the rise of the cooling water temperature Tw is delayed as the heat value of the engine 1 is decreased, but the water temperature rise judgement reference value is lowered as the heat value of the engine 1 is decreased. Therefore, it is possible to accurately judge whether there is abnormality in the thermostat valve 43 or the cooling liquid temperature sensor 14. Further, it is unnecessary to wait for the diagnosis until the warming up of the engine is sufficiently carried out unlike the conventional apparatus, and it is possible to complete the diagnosis before the cooling liquid temperature Tw reaches the criteria value (for example, 70° C.) which is set in the conventional apparatus.

The heat value of the engine 1 is corrected in accordance with the vehicle speed V, the intake air temperature Ta, the ignition timing ADV, the mixing ratio, the engine revolution number Ne and the like. Therefore, it is possible to calculate the heat value of the engine 1 at high accuracy, and the precision of the diagnosis can be enhanced.

The heat value correcting coefficient Ke is retrieved in accordance with the vehicle speed V based on a table shown in FIG. 5. An intake air mount integration value SUQIVL is corrected by the heat value correcting coefficient Ke such that the heat value correcting coefficient Ke is increased as the vehicle speed V is increased in corresponding to increase in the heat value of the engine 1 as the vehicle speed V is increased.

Further, the water temperature rise judgement reference value is corrected in accordance with the vehicle speed V, the intake temperature Ta and the like. With this correction, the water temperature rise judgement reference value can accurately be calculated in accordance with the radiation amount of the engine 1 and the radiator 44, and the precision of the diagnosis can be enhanced.

The heat radiation correcting coefficient Kr is retrieved in accordance with the vehicle speed V based on a table shown in FIG. 6. A water temperature rise judging reference value is corrected by the heat radiation correcting coefficient Kr such that the heat radiation correcting coefficient Kr is increased as the vehicle speed V is increased in corresponding to increase in the heat value of the radiator 44 as the vehicle speed V is increased.

The heat radiation correcting coefficient Kw is retrieved in accordance with the intake air temperature Ta based on a table shown in FIG. 7. The water temperature rise judging reference value is corrected by the heat radiation correcting coefficient Kw such that the heat radiation correcting coefficient Kw is decreased as the intake air temperature Ta is increased in corresponding to decrease in the heat value of the engine 1 as the intake air temperature Ta is increased.

Figure 11:
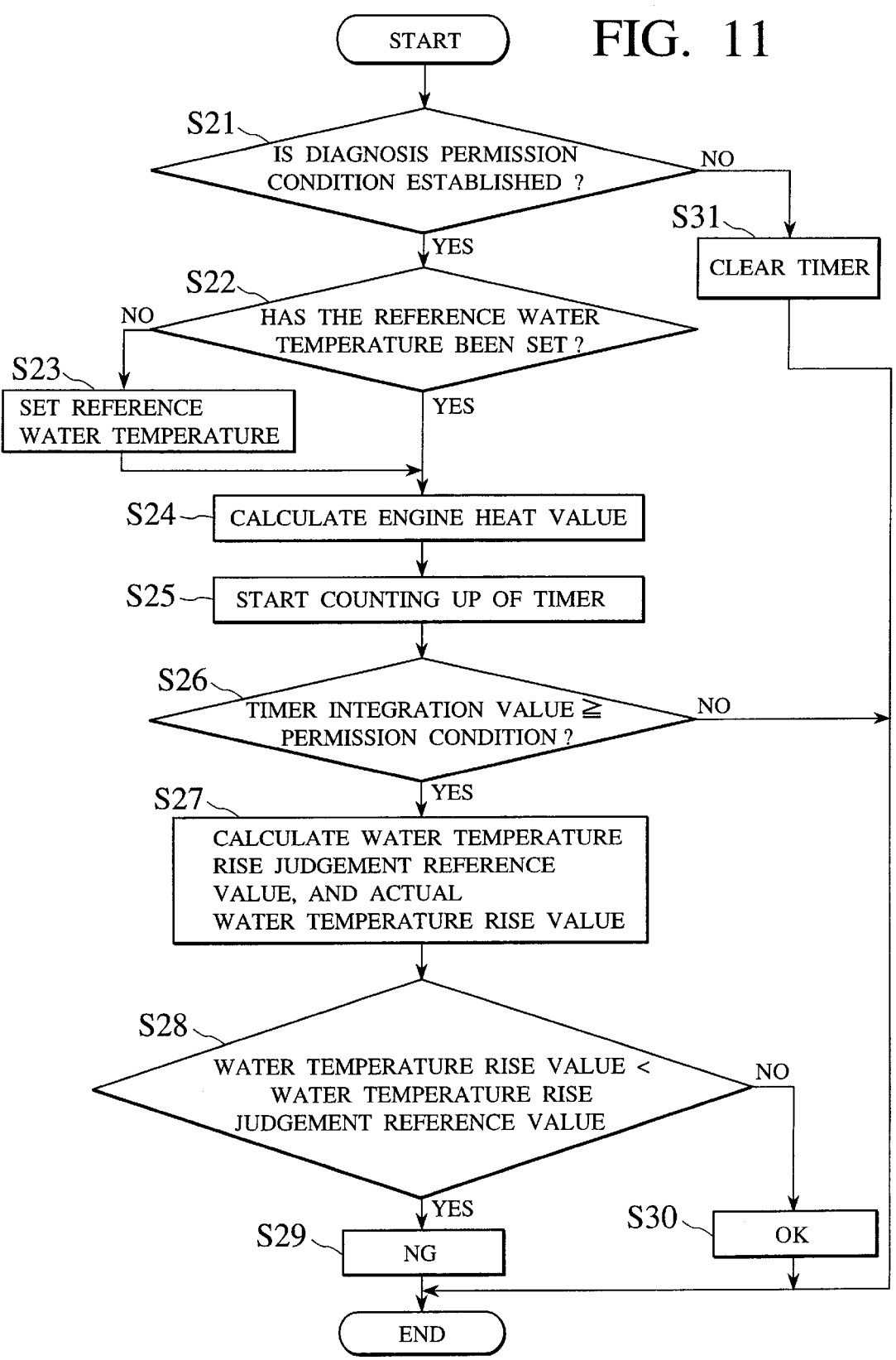
FIG. 11 is a flowchart showing a control content for diagnosing an abnormality of the cooling apparatus of the second embodiment of the invention.

A flowchart in FIG. 11 indicates a control program for diagnosing the abnormality of the cooling apparatus conducted by the control unit 12, and this program is conducted at predetermined cycles during driving of the engine 1.

First, it is judged whether a diagnosis condition is established in step S21. For judging the diagnosis condition, it is confirmed that the engine 1 is rotating, and that there is no abnormality in the cooling liquid temperature sensor 14, the air flow meter 9, the engine revolution number sensor 13, the intake temperature sensor 16 and the vehicle speed sensor 17. If the diagnosis condition is not established, the processing is advanced to step S11 where the timer which will be described later is cleared.

In step S22, it is judged whether a reference water temperature is set. If the reference water temperature is not set, the processing is advanced to step S23 where the current cooling liquid temperature Tw is set as the reference water temperature. If the reference water temperature is set, the processing is advanced to step S4.

In step S24, the heat value of the engine 1 is calculated. The heat value of the engine 1 is basically defined as a value SUQIVL obtained by integrating the intake air amount Qa detected by the air flow meter 9. The integration value SUQIVL of the intake air amount Qa is corrected by the heat value correcting coefficient Ke or the like. The process conducted in step S24 corresponds to the fourth section calculating the heat value of the engine in claims 6, 7 and 9, and to the section for correcting the heat value of the engine in claim 11. Further, the air flow meter 9 corresponds to the unit for detecting the engine load in claims 6, 7 and 9. A signal of the fuel injection amount Ti may be used as a parameter for detecting the load of the engine 1.

Subsequently, the processing is advanced to step S25 where the timer starts count up from the instant when the reference water temperature is set, and it is judged in step S26 whether the timer integration value reaches a permission condition corresponding to the judgement time T1.

If the timer integration value reaches the permission condition, the processing is advanced to step S27 where the water temperature rise judgement reference value is calculated, and the actual water temperature rise value is calculated. The water temperature rise judgement reference value is calculated in accordance with the heat value of the engine 1 in the measuring section. The water temperature rise judgement reference value is corrected by the heat radiation correcting coefficient Kr, heat radiation correcting coefficient Kw and the like. The water temperature rise value is calculated as a difference between the reference water temperature and the cooling liquid temperature Tw detected when the judgement time is elapsed. The processes in steps S25 to S27 correspond to the eighth section for calculating the liquid temperature rise judgement reference value in claim 7, and correspond to the section for calculating the liquid temperature rise judgement reference value in the claims.

Subsequently, the processing is advanced to step S28 where it is judged whether the water temperature rise value is lower than the water temperature rise judgement reference value. If the water temperature rise value is equal to or higher than the water temperature rise judgement reference value, the processing is advanced to step S30 where it is judged that the cooling system is normal. On the other hand, if the water temperature rise value is lower than the water temperature rise judgement reference value, it is judged that the abnormality is generated in the cooling system, and the warning lamp 24 is turned ON to inform the driver of this abnormality. The process in step S28 corresponds to the sections for judging whether the cooling system is abnormal in the claims.

Next, a third embodiment of the present invention will be explained.

Figure 12:
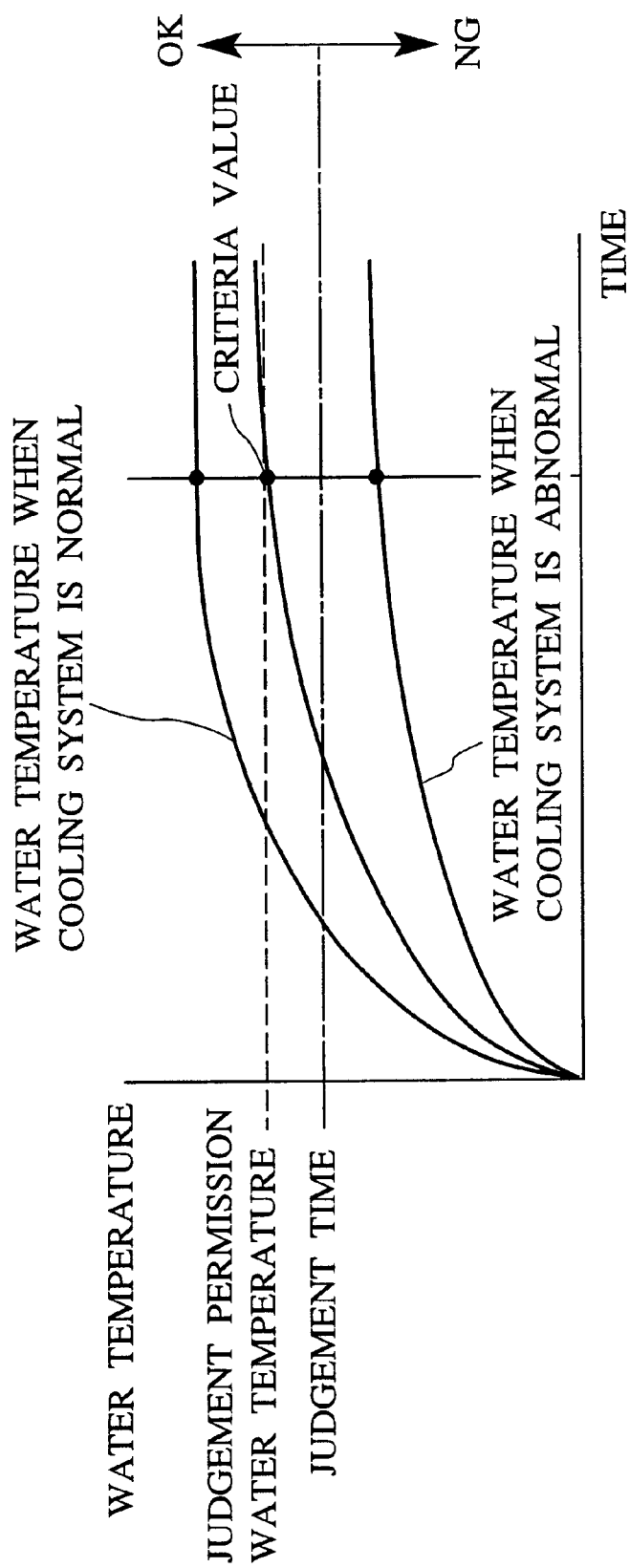
FIG. 12 is a graph showing an example in which a cooling water temperature of the engine of a third embodiment of the invention.

In the third embodiment, the load of the engine 1 detected when the engine is warmed up is integrated to calculated the heat value of the engine 1, the cooling liquid temperature is estimated based on the heat value of the engine 1, and the cooling liquid temperature Tw detected by the cooling liquid temperature sensor 14 when the estimated water temperature reaches the judgement permission water temperature is compared with a previously set criteria value. As shown in FIG. 12, if the cooling liquid temperature Tw is equal to or higher than the criteria value, it is judged that the cooling system is normal, and if the cooling liquid temperature Tw is lower than the criteria value, it is judged that the cooling system is abnormal.

With this feature, it is possible to judge whether the thermostat valve 43 or the cooling liquid temperature sensor 14 is abnormal without being influenced by the load state of the engine 1 at the time of warming up of the engine 1.

Similar to the above embodiments, the heat value of the engine 1 is corrected in accordance with the vehicle speed V, the intake air temperature Ta, the ignition timing ADV, the mixing ratio, the engine revolution number Ne and the like. Therefore, it is possible to calculate the heat value of the engine 1 at high accuracy, and the precision of the diagnosis can be enhanced.

The judgement permission water temperature is corrected in accordance with the vehicle speed V, the intake air temperature Ta and the like. With this feature, the judgement permission water temperature can accurately be calculated based on the heat radiation amount of the engine 1 and the radiator 44, and the precision of the diagnosis can be enhanced.

The heat radiation correcting coefficient Kr is retrieved in accordance with the vehicle speed V based on a table shown in FIG. 6. A judgement permission temperature is corrected by the heat radiation correcting coefficient Kr such that the heat radiation correcting coefficient Kr is increased as the vehicle speed V is increased in corresponding to increase in the heat value of the radiator 44 as the vehicle speed V is increased.

The heat radiation correcting coefficient Kw is retrieved in accordance with the intake air temperature Ta based on a table shown in FIG. 7. The judgement permission temperature is corrected by the heat radiation correcting coefficient Kw such that the heat radiation correcting coefficient Kw is decreased as the intake air temperature Ta is increased in corresponding to decrease in the heat value of the engine 1 as the intake air temperature Ta is increased.

Figure 13:
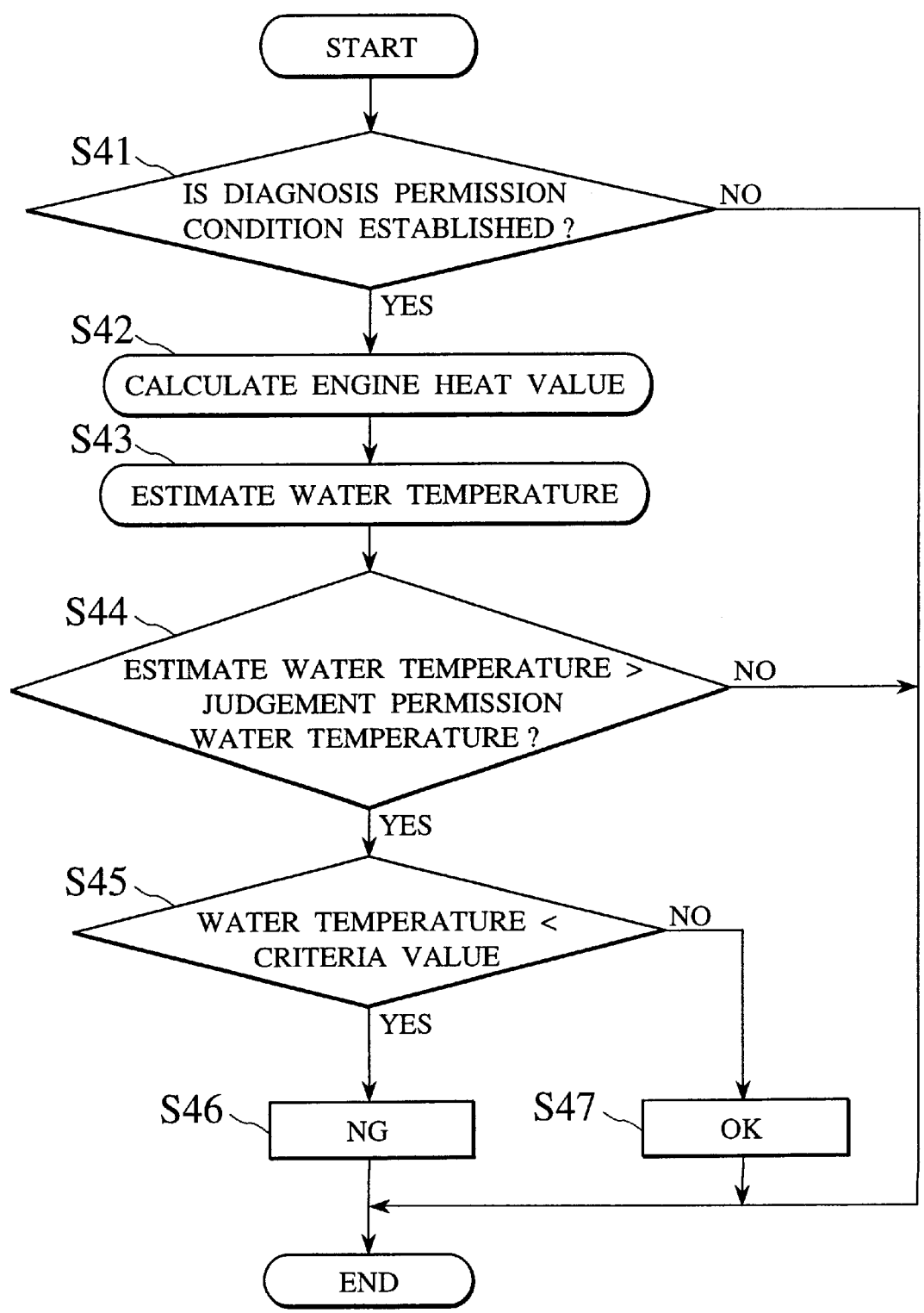
FIG. 13 is a flowchart showing a control content for diagnosing an abnormality of the cooling apparatus of the third embodiment of the invention.

A flowchart in FIG. 13 indicates a control program for diagnosing the abnormality of the cooling apparatus conducted by the control unit 12, and this program is conducted at predetermined cycles during driving of the engine 1.

First, it is judged whether a diagnosis condition is established in step S41. For judging the diagnosis condition, it is confirmed that the engine 1 is rotating, and that there is no abnormality in the cooling liquid temperature sensor 14, the air flow meter 9, the engine revolution number sensor 13, the intake temperature sensor 16 and the vehicle speed sensor 17.

In step S42, the heat value of the engine 1 is calculated. The heat value of the engine 1 is basically defined as a value S2UQIVL obtained by integrating the intake air amount Qa detected by the air flow meter 9. The integration value S2UQIVL of the intake air amount Qa is corrected by the heat value correcting coefficient Ke or the like. The process conducted in step S22 corresponds to the section calculating the heat value of the engine in the claims, and to the section for correcting the heat value of the engine in the claims.

Subsequently, the processing is advanced to step S43 where the cooling water temperature is estimated based on the heat value of the engine 1, and the processing is advanced to step S44 where it is judged whether the estimated water temperature reaches the judgement permission water temperature.

If it is judged the estimated water temperature reaches the judgement permission water temperature, the processing is advanced to step S45 where the cooling water temperature Tw detected by the cooling water temperature sensor 14 is compared with the previously set criteria value (for example, 70° C.). If the cooling water temperature Tw is equal to or higher than the criteria value, the processing is advanced to step S47 where it is judged that the cooling system is normal, and if the cooling water temperature Tw is lower than the criteria value, the processing is advanced to step S46 where it is judged that the abnormality is generated in the cooling system, and the warning lamp 24 is turned ON to inform the driver of this abnormality. The process in step S45 corresponds to the sections for judging whether the cooling system is abnormal in the claims.

What is claimed is:

1. An abnormality diagnosis apparatus of an engine cooling system comprising:
    a cooling liquid temperature sensor for detecting a cooling liquid temperature;
    a control unit connected to said cooling liquid temperature sensor, said control unit comprising,
        a first section for calculating a rise value of said cooling liquid temperature in a measuring section;
        a second section for judging a liquid temperature convergence time at which said rise value of said cooling liquid temperature in said measuring section becomes smaller than a predetermined value; and
        a third section for diagnosing that there is an abnormality in the cooling system when said cooling liquid temperature convergence time is smaller than a criteria value.

2. An abnormality diagnosis apparatus of an engine cooling system according to claim 1, further comprising:
    a unit for detecting a load of said engine, connected to said control unit; and
    said control unit further comprising a fourth section for integrating the load of said engine detected in said measuring section to calculate a heat value of said engine;
    wherein said second section judges whether the cooling liquid temperature is converging by the calculated heat value of said engine.

3. An abnormality diagnosis apparatus of an engine cooling system according to claim 2, wherein a reference value for judging the completion time of said measuring section based on said heat value of said engine is corrected in accordance with a vehicle speed or an intake air temperature.

4. An abnormality diagnosis apparatus of an engine cooling system according to claim 1, wherein said criteria value is corrected in accordance with a vehicle speed or an intake air temperature.

5. An abnormality diagnosis apparatus of an engine cooling system according to claim 2, wherein said heat value of said engine is corrected in accordance with at least one of a vehicle speed, an ignition timing, a mixing ratio and the engine revolution number.

6. An abnormality diagnosis apparatus of an engine cooling system comprising:
    a cooling liquid temperature sensor for detecting a cooling liquid temperature;
    a unit for detecting a load of an engine;
    a control unit connected to said cooling liquid temperature sensor and said unit for detecting a load of an engine, said control unit comprising,
        a section for integrating a detected load of said engine to calculate a heat value of said engine; and
        a section for diagnosing whether an abnormality is generated in said cooling system in accordance with said detected cooling liquid temperature and said heat value of said engine.

7. An abnormality diagnosis apparatus of an engine cooling system comprising:

a cooling liquid temperature sensor for detecting a cooling liquid temperature;

a unit for detecting a load of an engine;

a control unit connected to said cooling liquid temperature sensor and said unit for detecting a load of an engine, said control unit comprising, a section for calculating a rise value of a cooling liquid temperature in a judgement period of time based on a detected cooling liquid temperature;

a section for integrating a detected load of said engine to calculate a heat value of said engine;

a section for calculating a liquid temperature rise judgement reference value in said judgement period of time in accordance with the calculated heat value; and a section for diagnosing that an abnormality is generated in said cooling system when the rise value of the detected cooling liquid temperature is lower than said liquid temperature rise judgement reference value.

8. An abnormality diagnosis apparatus of an engine cooling system according to claim 7, wherein said liquid temperature rise judgement reference value is corrected in accordance with a vehicle speed or an intake air temperature.

9. An abnormality diagnosis apparatus of an engine cooling system, comprising:

a cooling liquid temperature sensor for detecting a cooling liquid temperature, a unit for detecting a load of an engine;

a control unit connected to said cooling liquid temperature sensor and said unit for detecting a load of an engine said control unit comprising, a section for integrating a detected load of said engine to calculate a heat value of said engine;

a section for estimating said cooling liquid temperature in accordance with the calculated heat value of said engine; and a section for diagnosing that an abnormality is generated in said cooling system when said detected cooling liquid temperature, detected when the estimated cooling liquid temperature reaches a first reference value, is lower than a second reference value.

10. An abnormality diagnosis apparatus of an engine cooling system according to claim 9, wherein said first reference value is corrected in accordance with a vehicle speed or an intake air temperature.

11. An abnormality diagnosis apparatus of an engine cooling system according to claim 6, wherein said heat value of said engine is corrected in accordance with at least one of a vehicle speed, an ignition timing, a mixing ratio and an engine revolution number.

12. An abnormality diagnosis apparatus of an engine cooling system according to claim 7, wherein said heat value of said engine is corrected in accordance with at least one of a vehicle speed, an ignition timing, a mixing ratio and an engine revolution number.

13. An abnormality diagnosis apparatus of an engine cooling system according to claim 9, wherein said heat value of said engine is corrected in accordance with at least one of a vehicle speed, an ignition timing, a mixing ratio and an engine revolution number.

* * * * *